Sept. 13, 1932.   D. R. KOONTZ   1,876,964
AUTOMATIC MEANS FOR REGULATING FLUID PRESSURE SYSTEMS
Filed Sept. 20, 1930   4 Sheets-Sheet 1

DAVID RAY KOONTZ
INVENTOR.
BY
ATTORNEY.

Sept. 13, 1932.  D. R. KOONTZ  1,876,964
AUTOMATIC MEANS FOR REGULATING FLUID PRESSURE SYSTEMS
Filed Sept. 20, 1930    4 Sheets-Sheet 3

DAVID RAY KOONTZ
INVENTOR.

BY *Paul S Eaton*

ATTORNEY.

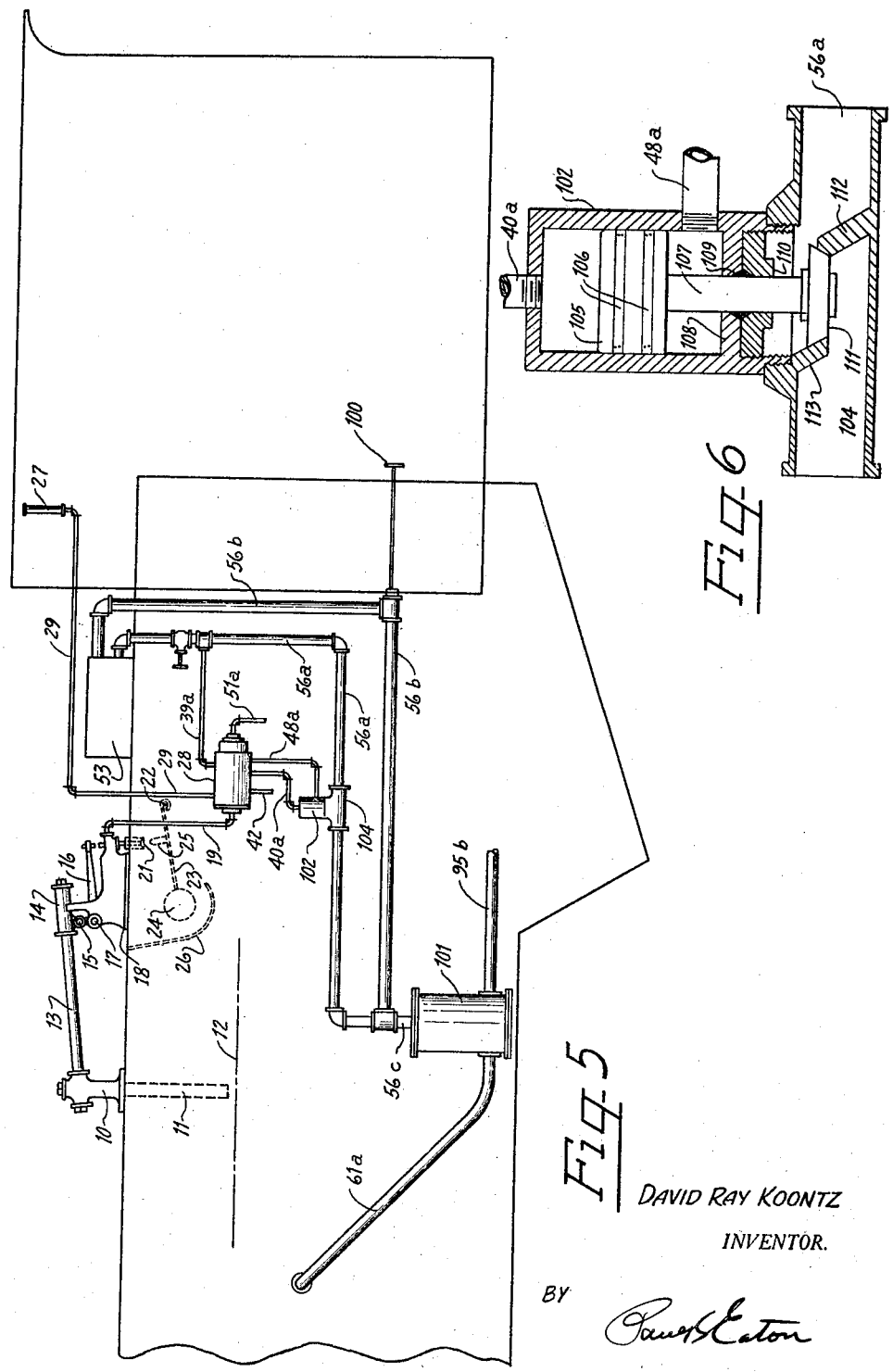

Patented Sept. 13, 1932

1,876,964

UNITED STATES PATENT OFFICE

DAVID RAY KOONTZ, OF SALISBURY, NORTH CAROLINA, ASSIGNOR OF ONE-HALF TO JAMES D. DORSETT, OF SPENCER, NORTH CAROLINA

AUTOMATIC MEANS FOR REGULATING FLUID PRESSURE SYSTEMS

Application filed September 20, 1930. Serial No. 483,307.

This invention relates to means for preventing the water level in locomotive boilers and other steam generating plants from becoming too low and provides means for automatically placing additional water into the steam generating compartment when the level of the water reaches a predetermined degree of lowness and also provides means for automatically stopping the flow of water into the steam generating compartment when the level of the water in said compartment has reached a predetermined stage of highness therein.

Heretofore it has been the custom in the operation of steam generating plants and especially on locomotives to have a low water alarm in which a pipe projects from the top of the boiler to a certain distance downward and when the water level reaches the point which is below the lower end of said pipe the steam is allowed to emerge through said pipe and this steam heats a pipe member which causes the same to expand and release a valve to allow steam to escape through a pipe to a whistle to blow the same to warn the engineer that the water supply was becoming low in the boiler.

In certain instances explosions have occurred due to the fact that for some reason the low water alarm would fail to function or would be disregarded by the engineer and I have devised means whereby the passing of steam through the mechanism provided for the low water alarm will first automatically start the flow of water into the locomotive boiler and at the same time blow the low water alarm to serve a double purpose of giving an alarm and automatically starting the flow of water into the boiler.

Also I have provided means whereby the placing of water into the boiler can be controlled manually as heretofore, as my apparatus in nowise interferes with the operation of the various parts associated with the locomotive for injecting or pumping water thereinto.

Some of the objects of my invention having been stated other objects will appear as the description proceeds when taken in connection with the accompanying drawings, in which—

Figure 5 is a view of the reverse side of the locomotive from that shown in Figure 1 and showing my device associated with means for operating the steam pump of the locomotive;

Figure 6 is an enlarged detailed cross-sectional view of the valve for automatically allowing steam to start the steam pump in operation.

Figure 1:
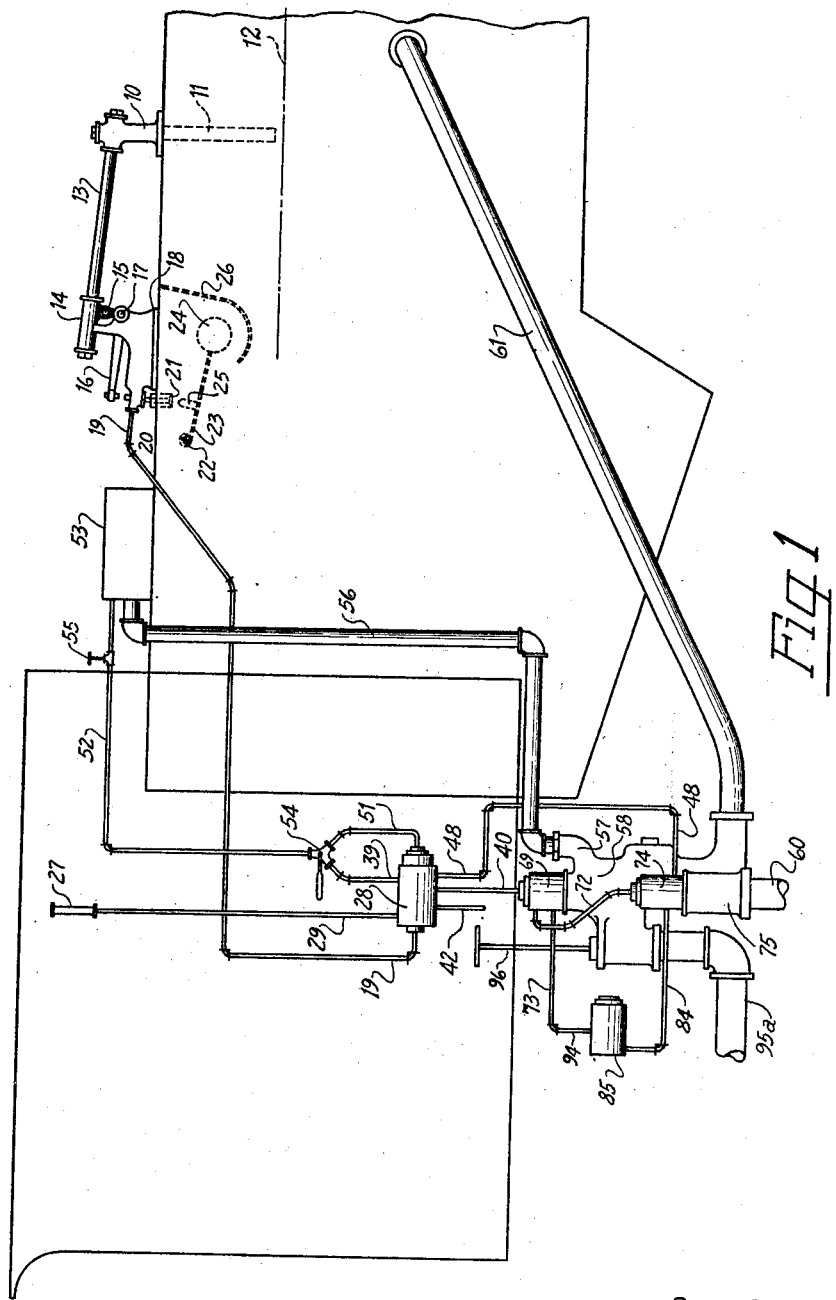
Figure 1 is a side elevation of a portion of a locomotive showing my invention associated therewith.

Referring more particularly to the drawings the numeral 10 indicates a hollow member secured to the upper portion of a locomotive boiler and a pipe 11 projects downwardly inside the boiler to a point indicated by the dotted line 12 which we will say is the low water line in a locomotive boiler. Secured to the upper end of the member 10 is a pipe 13 which is secured in a member 14 which is pivotally mounted as at 15 to a bell crank lever 16 which bell crank lever is pivotally mounted as at 17 on a member 18 secured on top of the boiler, and mounted in this member 18 is a pipe 19 which registers, through valve 20 with the interior of the boiler. The valve 20 has a stem 21 projecting into the interior of the boiler and pivotally secured on the inside of the boiler as at 22 is an arm 23 on the end of which is a float 24 which float has a projection 25 adapted to engage the stem 21 to close the valve 20 and stop the steam from passing through the pipe 19 when the water level has reached a predetermined high point in the boiler. This float mechanism has a shield 26 adapted to support the float 24 after the water has reached the predetermined low level in the boiler, and to prevent the temporary movement of the water from affecting the float.

The pipe 19 in the ordinary equipment of locomotives has heretofore been led to a low water whistle 27 but in my invention I lead this pipe 19 to one end of a cylinder 28 and from the interior of this cylinder 28 a pipe 29 is led to the low water whistle 27.

This casing 28 has a plug 30 threadably secured in one end thereof and in this plug the pipe 19 is secured to communicate with the interior of the cylinder. Pipe 29 also communicates with the interior of this cylinder, both pipes communicating with an enlarged portion 31 in which a portion of piston 32 is mounted. This piston 32 has the enlarged portion 33 which is adapted to have movement in the cavity 31 and this portion 33 has a packing ring 34 to prevent leakage, said member 33 being secured on the piston 32 by means of a nut 35.

Figure 3:
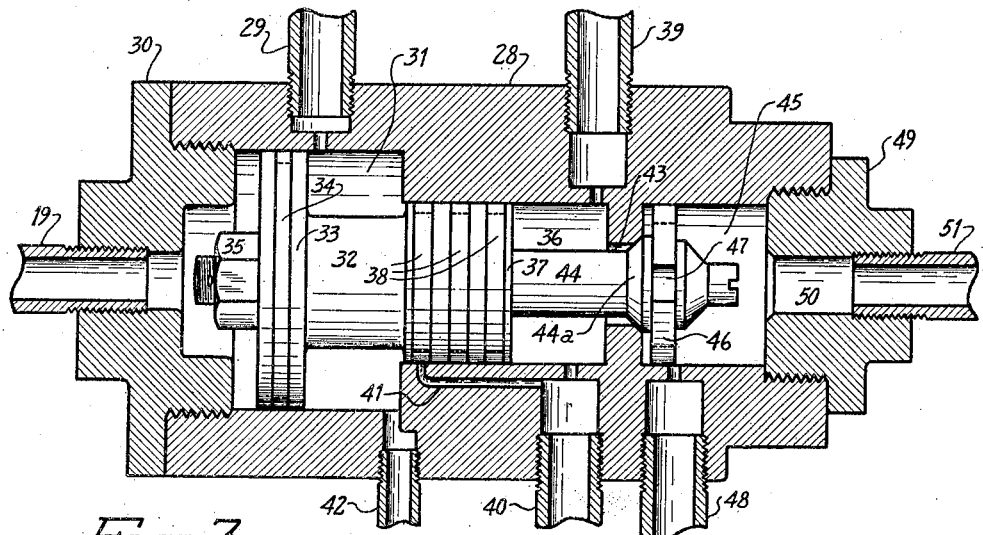
Figure 3 is a longitudinal cross-sectional view of the cylinder shown in the left central portion of Figure 1 showing the parts in a position where the injector or pump will not be operated to force water into the boiler.
Figure 4:
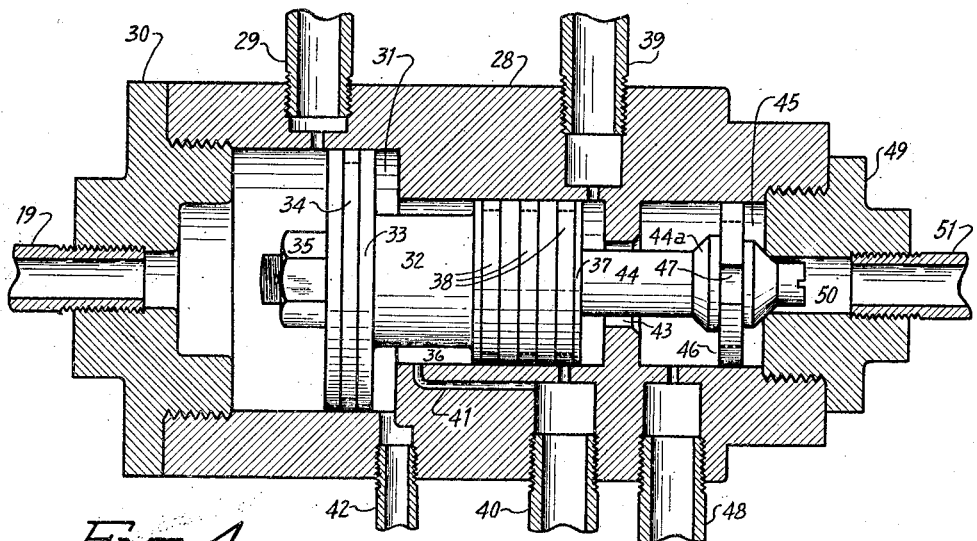
Figure 4 is a view similar to Figure 3 but showing the parts in position to force water into the boiler.

The restricted circular cavity 36 has one end thereof in communication with the cavity 31 and in this portion 36 the circular member 37 is adapted to have sliding movement, said member 37 being integral with the piston 32 and this member has a plurality of packing rings 38 mounted thereon to prevent the passage of steam thereby, and communicating with this cavity 36 is a pipe 39, and also pipe 40, and also by-pass 41 communicates with the pipe 40 and also the extreme left hand portion of cavity 36 as shown in Figures 3 and 4. Also communicating with the cavity 31 is pipe 42.

The casing 28 has the restricted portion 43 in which the stem 44 is adapted to have sliding movement with some space between the stem 44 and the sidewalls of portion 43 to allow steam to pass around the portion 44 of said piston and this portion 43 which communicates with the cavity 36 also communicates with a cavity 45 in which the guide member 46 is slidably mounted.

The guide member 46 has cutaway portions 47 to allow steam to pass freely from chamber 36 into chamber 45 when the parts are in the position shown in Figure 4; but a seat is formed in the right hand end of passageway 43 in which valve 44a seats when the parts are in position as shown in Figure 3. Communicating with chamber 45 is a pipe 48 and the right hand end of chamber 45 as seen in Figure 4 is closed by a plug 49 which has a port 50 therein in which pipe 51 is secured.

A pipe 52 leads from steam turret 53 to a manually operated two-way valve 54. There is a manual valve 55 also in said line close to said steam turret. From the manually operated two-way valve 54 the pipes 39 and 51 lead to the interior of casing 28.

Figure 2:
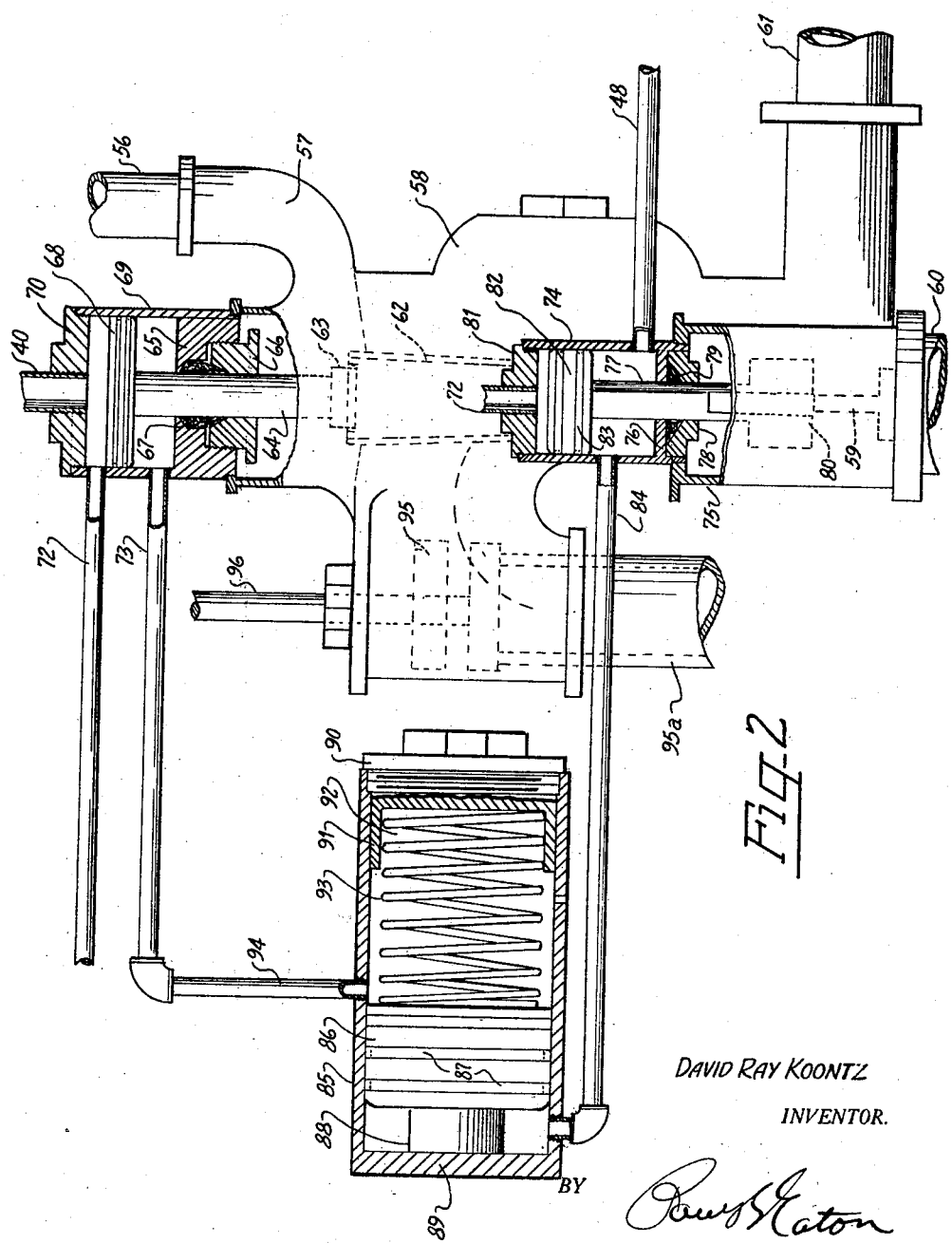
Figure 2 is an enlarged view with portions in cross section of the lower left hand central portion of Figure 1.

In Figures 1 and 2 I have shown an injector and the connections whereby the injector is automatically operated through the cylinder 28 and associated parts and I shall first proceed to describe the injector and associated parts.

Leading from steam turret 53 is a steam line 56 which leads to the steam intake portion 57 of injector 58 which injector at the lower portion thereof has an overflow valve 59 and from this overflow portion a waste pipe 60 leads. From the bottom of the injector also leads a pipe 61 which leads into the boiler below the water line and through which the water passes from the injector into the boiler. This injector is of conventional design and has a steam valve seat 63 at the top portion thereof which when opened will allow the steam passing through pipe 56 to pass through the injector jets and to force water through the injector.

Valve 63 is mounted on the bottom of a valve stem 64 which is slidably mounted in members 65 and 66 with packing 67 therebetween, and this stem is secured to a piston 68 which is slidably mounted in a cylindrical casing 69 which is threadably secured in the top of the injector which heretofore has been normally closed by a suitable plug. The upper end of this casing 69 is closed by a suitable plug 70 and threadably secured in this plug 70 is the pipe 40 which communicates with the interior of the upper portion of casing 69. In the upper sidewall of casing 69 a pipe 72 communicates with the interior of said cylinder above the piston 68 and near the lowermost portion of the cavity in cylinder 69 also a pipe 73 communicates with the interior of said cylinder. Pipe 72 leads to the upper end of a casing 74 which is threadably mounted in the overflow portion of the injector instead of the manually operated valve heretofore used in the upper end thereof, said overflow cylinder being indicated by the reference character 75. This casing 74 has a bottom member 76 therein through which valve stem 77 passes and a nut 78 is secured to the lower end of this cylinder with packing 79 between said nut and the lower side of said bottom 76 to allow movement of said valve stem 77 in said packing.

The lower end of valve stem 77 is provided with an overflow valve portion 80 which cooperates with the portion 59 heretofore described. This casing 74 has a plug 81 threadably secured in the upper end thereof, in which plug the pipe 72 is threadably secured to communicate with the upper end of the interior of casing 74. The valve stem 77 has secured on the upper end thereof piston 82 with suitable packing rings 83 therein and about midway of the casing 74 a pipe 84 communicates with the interior of said casing and on the opposite side of said casing in close proximity to the bottom portion thereof pipe 48 is connected to communicate with the interior of said casing.

Pipe 84 leads to a cylindrical casing 85 and communicates with the interior thereof at one end thereof, and slidably mounted in said casing 85 is a piston 86 which has suitable piston rings 87 mounted thereon to prevent leakage of steam, and this piston 86 has a projection 88 which is adapted to normally rest against closed end 89 of said cylinder and the other end of said cylinder is closed by a suitable plug 90 being threadably secured therein, said plug having a projecting rim portion 91 around the periphery thereof forming a cavity 92 in which cavity a compression spring 93 has one end thereof mounted and the other end of said compression spring 93 is adapted to press against the end of piston 86 opposite the end on which the projection 88 occurs to normally force the piston 86 to the position shown in Figure 2.

On the other side of piston 86 as it appears in normal position a pipe 94 communicates with the interior of said casing 85 so that when steam is allowed to pass through pipe 84 it will force piston 86 to the right of Figure 2 and allow the steam to pass through pipe 94 into the casing 69 below the piston 68.

The injector 58 has a manually operated valve 95 controlled by stem 96, as is conventional, through which water passes from the tender or other source of supply to the injector through this valve and this valve is normally in open position to allow my mechanism to operate automatically. Pipe 95a leads from a source of water supply to injector 58.

In Figures 5 and 6 I have shown the reverse side of that shown in Figure 1 in which I show my casing 28 associated with means for automatically operating a steam water pump instead of operating an injector as shown in Figure 1.

In the operation of locomotives it is a requirement that each locomotive be equipped either with two injectors or with an injector and a steam water pump and by providing the injector mechanism on one side and the steam water pump injector mechanism on the other side of the locomotive this requirement is complied with.

In associating my cylinder 28 with means for automatically operating a steam water pump part of the structure previously described for Figure 1 will be used and the cylinder 28 will be identical and the low water alarm pipe 19 will be led to the same point on the cylinder and also the pipe 29 will be led to the low water alarm whistle but pipe 39a which corresponds to pipe 39 in Figure 1 is led to the source of steam supply 56a and pipe 51a which corresponds to pipe 51 in Figure 1 becomes a drain pipe instead of being connected to the steam turret through valve 54 for operation of the injector. The pipe 42 serves as a drain in Figure 5 as well as in Figure 1, while pipes 40a and 48a are connected to the automatic valve for opening the steam pressure to the steam water pump. The pipe 40a leads into the top of casing 102 and the pipe 48a leads into the bottom of casing 102 which is screwed into the valve housing 104. And in this connection it might be stated that an additional pipe 56b is provided leading from the steam turret 53 to the steam water pump 101 and connects with pipe 56c leading into the steam water pump 101 which is a conventional steam water pump and pipe 95b which corresponds with 95a in Figure 1 leads from a source of water supply into the pump 101 and the pipe 61a which corresponds to pipe 61 in Figure 1 leads into the locomotive boiler.

A valve handle 100 is provided in steam line 56b so that the steam pump can be started manually by an attendant if desired without waiting for automatic operation by the apparatus shown in Figures 5 and 6. The casing 102 is threadably secured in the valve housing 104 and this casing 102 has slidably mounted therein a piston 105 with suitable piston rings 106 thereon and the piston 105 has a valve stem 107 projecting through the bottom 108 of cylinder 102 and packing 109 is provided which is driven home by means of a nut 110 which is threadably secured on the interior of the lower portion of the cylinder 102. This valve stem 107 has secured thereon the valve 111 which seats on the seat member 112 this being a conventional valve structure.

*The method of operation of the injector*

Normally the piston 32 will occupy the position shown in Figure 3 of the drawings and steam will be passing through pipes 52 and 39 and through pipe 40 to the top of steam valve piston 68 in casing 69 and through pipe 72 to the top of casing 74 to hold steam and overflow valves in closed position on account of the fact that the top of the steam valve in casing 69 being in communication with the top of the overflow lifter valve in casing 74 and the overflow valve will not be operated. Therefore the steam valve in casing 69 will be held in closed position and also the overflow valve will be held in closed position. Now when the water in the boiler reaches a point indicated by the dotted line 12 and steam is allowed to pass through pipe 11 and also into pipe 13 and expand member 13 and open valve 20 and allow steam pressure to pass through the pipe 19 then the piston will be moved to the position shown in Figure 4 and steam pressure will pass through pipe 29 to blow low water whistle.

At the same time the steam pressure passing through pipe 39 will pass into pipe 48 to the bottom of overflow valve lifter and pressure will be cut off from the pipe 40 and relieve the pressure from the top of the steam valve operating mechanism which pressure will leak through port 41. And when this happens steam will enter casing 74 through pipe 48 and move the piston to the position shown in Figure 2 and when this occurs this will start the water flowing through the overflow valve and through the entire injector but the steam valve will not be opened because it is absolutely necessary that water start flowing through the injector before the steam valve is opened and allowed to pass through the injector. This is accomplished by the steam passing through pipe 84 into casing 85 and moving piston 86 to the right until steam is allowed to pass through pipe 94 into pipe 73 and into the casing 69 below the piston 68 and move the valve stem 64 upward to allow steam to pass into the injector from steam pipe 56 after the water has started flowing therethrough.

When the water has reached a predetermined height then the float mechanism shown by the reference character 24 and associated parts will close the valve 20 and stop the operation of the injector before the boiler becomes filled to too high a level, as it takes some time for pipe 13 to cool enough to allow arm 16 to be removed automatically from valve 20.

The injector 58 has a conventional valve, not shown, which automatically stops overflow when steam and water start passing through the injector into the boiler.

*Method of operation of steam water pump*

Using casing 28 and associated parts it is seen that with the parts in normal position as shown in Figure 3 that steam will be passing through pipe 40a to the upper portion of casing 102 to close valve 111 and to hold the same in closed position. And of course valve 100 in pipe 56b would be closed also. Now when the low water whistle pipe 19 has steam passed therethrough the parts will be moved into position shown in Figure 4 and steam will pass out through pipe 29 as described for the injector and blow the low water whistle. Also steam will be cut off from pipe 40a and will pass through pipe 48a and therefore the piston 105 in casing 102 will be raised upwardly and open valve 111 and allow steam to pass through pipe 56a and into pipe 56c and into the steam water pump of conventional design indicated by the reference character 101. The operation of this steam pump will likewise be automatically stopped when the water has reached the proper height by means of the float 24 and associated parts.

Although I have shown a particular type of injector, I desire it to be understood that this invention can be applied to any type of injector or steam pump.

Throughout the specification I have referred to "steam" as the operating fluid. It is of course evident that any source of fluid supply under pressure can be utilized.

Although I have shown cylinder 28 associated with a steam generator, it is evident that it may be used in connection with any fluid pressure system for controlling said system.

In the drawings and specification I have set forth a preferred embodiment of my invention, and although specific terms are employed, they are used in a generic and descriptive sense only, and not for purposes of limitation, the scope of the invention being set forth in the appended claims.

I claim:

1. In a steam generating system having an injector for forcing water into said system by steam pressure from said system, said injector having an overflow valve and a valve for controlling the passage of steam into said injector, means adapted to be operated by the steam pressure for opening the overflow valve, retarding means through which the steam opening the overflow valve is adapted to be passed after raising the overflow valve, a pipe leading from the other side of said retarding means to means associated with said steam valve for opening the same, said retarding means being adapted to delay the passage of steam from the overflow valve to the steam valve for a sufficient time to allow water to pass through the injector and through the overflow valve before the steam valve is opened.

2. In a steam generating system having an injector for forcing water thereinto, said injector having an overflow valve and a steam intake valve, means associated with said valves and connected to the steam pressure of said system for holding said valves in closed position by means of steam pressure, means adapted to be operated by another steam connection from said generating system for relieving the first named pressure from said valves for successively opening the overflow valve and the steam intake valve, means for retarding the passage of steam from the overflow valve to said steam intake valve for opening the same until after the overflow valve has been opened, and means for returning said parts to normal position when a predetermined amount of water has been forced into said system.

3. In a steam generator, means for automatically forcing water into the generator, said means comprising a control member steam connections between said control member and the generator for holding the control member in normal position, an injector having an overflow valve and a steam intake valve, a cylinder associated with each of said valves, a piston in each of said cylinders, a connection between said valves and said pistons, connections for normally conducting steam from the generator thru said control member to one side of each of said pistons for each of said valves to hold the valves in closed position, a second connection between said generator and said control member, means operable by a predetermined lowness of water in the generator for conducting steam from the generator to another portion of said control member to move the same to relieve the pressure from one side of each of said pistons for operating the overflow valve and to supply pressure to its other side to open the same, a pipe for conducting the steam from the cylinder associated with the overflow valve to the other side of the piston for operating the steam intake valve of the injector, and means in said last pipe for retarding the flow of steam from the overflow valve to the intake valve.

4. In a steam generator, means for automatically supplying water thereto, said means comprising a control member having a steam connection with the generator, an injector having an overflow valve and a steam intake valve, a piston connected to each of said valves, a casing for each of said pistons, a steam pipe connected to the top of said casings and to the generator to normally hold said valves in closed position, a steam pipe connected to the bottom of the casing for the overflow valve and to said control member, a pipe leading from said overflow valve casing to the lower side of the piston in the casing for the steam intake valve, retarding means in said last named pipe, a second steam connection between the control member and said generator, a low water actuated member for allowing steam to pass to said control member thru said second connection to operate the control member to relieve the pressure from the top of the casings for said valves and to supply pressure successively to the lower side of the pistons for said valves to open them to operate the injector to force water into the generator.

5. In a steam generator, a low water actuated valve, a control mechanism, a normally uncharged piped connection from said valve to the control mechanism, a normally steam charged piped connection between the generator and the control mechanism for holding the control mechanism in one position, an injector having a piston operated overflow valve and a piston operated steam intake valve, a cylinder for each piston, normally steam charged piped connections between the control mechanism and one side of said pistons for holding the valves in closed position, a normally uncharged piped connection between the control mechanism and the other side of the piston for the overflow valve, a piped connection between the cylinder for the overflow valve and the cylinder for the intake valve, retarding means in said last-named piped connection, the low water actuated valve being adapted to permit steam from the generator at a predetermined low water line therein to shift the position of the control mechanism to render uncharged the normally charged pipes and to charge the normally uncharged pipes to actuate said overflow and intake valves in succession to thereby render operative the injector to force water into the generator.

6. In a steam generator having an injector equipped with an overflow valve and a steam intake valve, a low water actuated valve, means for causing the steam pressure of the generator to force said valves into closed position, means operable by the low water actuated valve for relieving the steam pressure for holding the valves in closed position and applying steam pressure to successively open the overflow valve and the steam intake valve, and means between the overflow valve and the steam intake valve for retarding the movement of the steam intake valve an appreciable amount of time after the overflow valve is opened.

7. In a steam generator having an injector equipped with an overflow valve and a steam intake valve, means for normally exerting steam pressure on said valves to hold them in closed position, a low water actuated valve, means operable by steam passing thru said low water actuated valve for relieving the normal pressure on said overflow valve and steam intake valve and also applying steam pressure to open first the overflow valve and then the steam intake valve, and means for retarding the opening of the steam intake valve.

8. In a steam generator, control means, a low water actuated valve having one side connected to the generator and its other side connected to the control means, a second pipe connected to said generator and to said control means, a low water alarm connected to said control means, steam operated means for forcing water into the generator, a steam pipe leading from the generator to the water forcing means a control valve in the steam pipe leading to said forcing means, a pipe normally charged with steam leading from the control means to said control valve to prevent steam from the generator from reaching forcing means, a pipe normally uncharged with steam leading from the control means to the other side of the control valve, the low water actuated valve when actuated being adapted to move the control means to render uncharged the normally charged pipes leading from the control means and to render charged the normally uncharged pipes leading from the control means to actuate the control valve to render the forcing means operative and to actuate the low water alarm.

9. In a steam generator, means for forcing water into the generator, comprising a control mechanism, a pipe between the control mechanism and the generator adapted to be normally charged with steam, a second normally uncharged piped connection between the control mechanism and the generator, a low water actuated valve in said uncharged connection, a steam operated water forcing device, a normally steam charged piped connection between the generator and the water forcing device, a control valve in said last named connection, a normally steam charged piped connection between the control mechanism and one side of the control valve for holding the same in closed position, a normally uncharged piped connection between the control mechanism and the control valve, the actuation of the low water actuated valve being adapted to move the control mechanism to render the steam charged connections from the control mechanism uncharged and to charge with steam to normally uncharged connections from the control mechanism to move the control valve to actuate the steam operated water forcing means.

In testimony whereof I affix my signature.

DAVID RAY KOONTZ.